United States Patent
Mazur

[11] Patent Number: 6,056,262
[45] Date of Patent: May 2, 2000

[54] UNIVERSAL COUPLER FOR A SELF ALIGNING LINEAR ACTUATOR

[75] Inventor: Mikhail Mazur, San Francisco, Calif.

[73] Assignee: Applied Mateials, Inc., Santa Clara, Calif.

[21] Appl. No.: 09/200,283

[22] Filed: Nov. 24, 1998

[51] Int. Cl.[7] .............................. F16K 31/04; F16K 25/00
[52] U.S. Cl. ................ 251/129.11; 251/86; 74/424.8 VA
[58] Field of Search .................. 251/129.11, 84, 251/86, 88; 74/424.8 VA

[56] References Cited

U.S. PATENT DOCUMENTS

| | | | |
|---|---|---|---|
| 3,313,178 | 4/1967 | Saunders | 74/424.8 VA X |
| 3,327,826 | 6/1967 | Henschke | 74/424.8 VA X |
| 4,647,006 | 3/1987 | Glynn et al. | 251/86 |
| 4,756,506 | 7/1988 | Meyers et al. | 251/129.11 |
| 4,790,346 | 12/1988 | Kolze et al. | 251/88 X |
| 5,464,039 | 11/1995 | Bergamini | 251/129.11 X |
| 5,709,369 | 1/1998 | Hawkins et al. | 251/86 |
| 5,916,325 | 6/1999 | Madrid et al. | 74/424.8 X |

*Primary Examiner*—John Rivell
*Assistant Examiner*—Meredith H Schoenfeld
*Attorney, Agent, or Firm*—Thomason Moser Patterson

[57] ABSTRACT

A universal coupler for a self aligning linear actuator for a valve assembly. The self aligning linear actuator utilizes a drive screw or other threaded drive means to drive a plunger for a throttle valve. The drive screw rotates within a frame while a threaded collar or ball screw coupled to a drive coupler drives the plunger parallel to the drive screw. The universal coupler relieves any bending strain induced by misalignment between the drive screw and the plunger by allowing pivotal movement of the drive coupler relative to the drive screw.

20 Claims, 4 Drawing Sheets

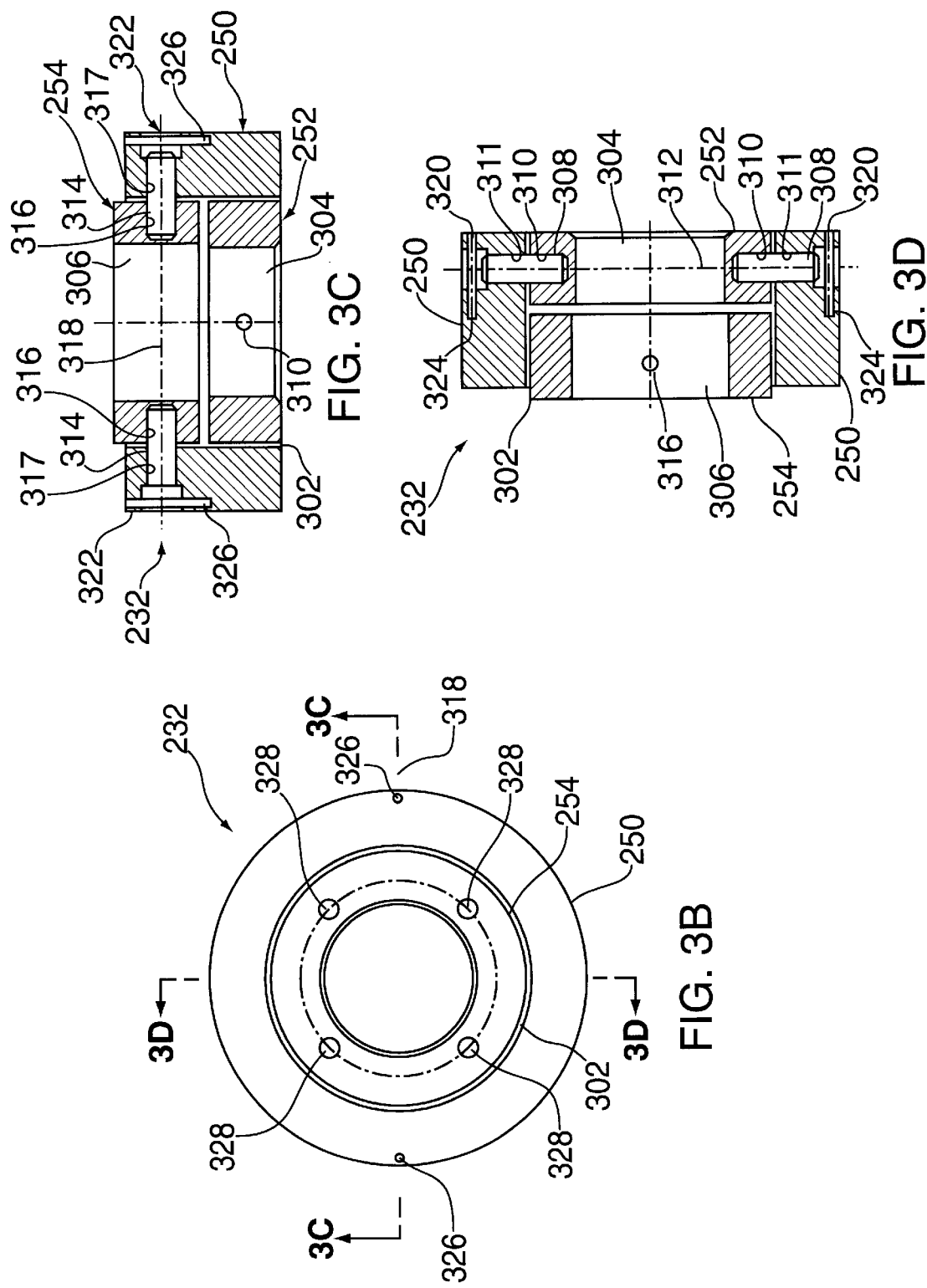

UNIVERSAL COUPLER FOR A SELF ALIGNING LINEAR ACTUATOR

BACKGROUND OF THE DISCLOSURE

1. Field of the Invention

The invention relates to lifting screw mechanisms and, more particularly, the invention relates to throttle valve control assemblies for semiconductor wafer processing chambers.

2. Description of the Background Art

Throttle valves are used in many applications for adjusting the rate of flow of gases and liquids. A typical throttle valve regulates the flow of a liquid or gas by adjusting the position of a plunger relative to a valve housing. A particular application of throttle valves is in regulating the flow of gases in a semiconductor processing chamber. In such a throttle valve, linear movement of the plunger relative to the valve housing is accomplished by a lift screw mechanism. The lift screw mechanism transfers rotational movement of a threaded screw into linear movement of the plunger.

FIG. 1 depicts a simplified, partial cross-sectional view of a prior art throttle valve assembly 50 that employs a lift screw mechanism 103 coupled to a throttle valve 100. The throttle valve 100 comprises a valve housing 102 containing a plunger 104. The plunger 104 moves linearly relative to the valve housing 102 to regulate the flow of a liquid or gas from an inlet (not shown) through the housing 102 to an outlet (not shown). In the prior art throttle valve assembly 50, a hollow tube 107 extends from the plunger 104. A threaded nut 105 is fixed to an end of the tube 107. The nut 105 receives a threaded drive screw 106 with the end of the drive screw 106 extending into the tube 107. The drive screw 106 is coaxially aligned with an axis 101. A bearing 108 is affixed to the housing 102. The drive screw 106 rotates freely in the bearing 108. As the drive screw 106 rotates about the axis 101 the threads of the drive screw engage the threads of the nut 105 thereby imparting a linear motion to the plunger 104 along the axis 101. As the plunger 104 moves upward, the drive screw 106 is received in the tube 107.

Motive power for rotating the screw 106 is provided by a motor 118 such as an electric motor. A first pulley 110 is attached to a distal end of the drive screw 106. A drive belt 112 is looped about the first pulley 110 and a second pulley 114. The second pulley 114 is attached to a drive shaft 116 of the motor 118. The drive shaft 116 is aligned with a drive axis 55 that is substantially parallel to the axis 101. The motor 118 is fixed relative to the valve 100 such that rotation of the drive shaft 116 imparts motive power to the drive screw 106 via the pulleys 110 and 114 and the drive belt 112.

In the prior art throttle valve assembly 100, the axes 101 and 55 must be precisely aligned. A misalignment of the axes 101 and 55 (i.e., the axes are not parallel) will cause the drive shaft 116 to exert a bending stress on the drive screw 106. The bending stress causes a bending strain on the drive screw leading to wear that seriously shortens its useful life.

Therefore, a need exists in the art for a lift screw mechanism for a throttle valve assembly in which the drive screw is not required to be exactly parallel with the drive axis.

SUMMARY OF THE INVENTION

The disadvantages associated with the prior art are overcome by the present invention of a self aligning lift screw mechanism having a driving member coupled to a drive coupler by a universal coupler. The universal coupler relieves a bending strain between the driving member and the drive coupler due to misalignment between the driving member and the drive coupler. Preferably, the driving member is a threaded drive member such as a drive screw, lead screw or ball screw. If a threaded drive member is used, the drive coupler is coupled to the universal coupler by a nut, threaded collar or ball nut that engages the threads of the driving member. Rotation of the driving member about its axis imparts axial movement to the drive coupler along the axis of the driving member. A motor, such as a stepper motor, is directly coupled to the driving member for imparting rotational movement to the driving member.

The universal coupler comprises an outer cylinder and first and second inner cylinders disposed within an axial bore in the outer cylinder. Each of the inner cylinders also has an axial bore. All three cylinders and all three bores are substantially coaxially aligned. The first and second inner cylinders have approximately the same outer diameter and are substantially coaxially aligned with one another. The first and second inner cylinders are pivotally connected to the inner surface of the outer cylinder. The driving member is coupled to the first inner cylinder and the drive coupler is coupled to the second inner cylinder such that pivotal movement of one or both of the inner cylinders avoids a bending strain between the driving member and the drive coupler.

Each inner cylinder is pivotally connected to the outer cylinder by a pair of opposed dowel pins, disposed between the inner cylinder and the outer cylinder. A first pair of dowel pins allows for pivotal movement of the first inner cylinder about a first pivot axis perpendicular to a cylinder axis of the outer cylinder. A second pair of dowel pins allows for pivotal movement about a second pivot axis perpendicular to both the axis of the outer cylinder and the first pivot axis.

In an illustrative embodiment of the invention, the lift screw mechanism is part of a throttle valve assembly. The valve assembly generally comprises a valve body, a housing, a threaded driving member, a drive coupler, a plunger guide and a plunger. The plunger is received in the valve body and attached to the plunger guide. The threaded driving member is rotatably mounted at first and second ends within the housing. The drive coupler is adapted for translational movement substantially parallel to the drive member. The plunger guide is substantially aligned with the driving member and attached to the drive coupler such that linear motion of the drive coupler imparts linear motion to the plunger guide. The driving member is coupled to the drive coupler by, for example, the threaded collar and universal coupler. A flexible bellows, disposed about the plunger guide isolates an atmosphere side of the throttle valve from a vacuum side, i.e., the side that is inside the bellows containing the chamber environment and its various gases. The bellows are sealed at a first end to a cap on the valve body and sealed at a second end to the plunger.

BRIEF DESCRIPTION OF THE DRAWINGS

The teachings of the present invention can be readily understood by considering the following detailed description in conjunction with the accompanying drawings, in which:

FIG. 3B is a top plan view of the universal coupler of the present invention;

FIG. 3C is a cross sectional view of the universal coupler taken along lines 3C—3C of FIG. 3B; and FIG. 3D is a cross sectional view of the universal coupler taken along lines 3D—3D of FIG. 3B.

To facilitate understanding, identical reference numerals have been used, where possible, to designate identical elements that are common to the figures.

DETAILED DESCRIPTION

Figure 1:
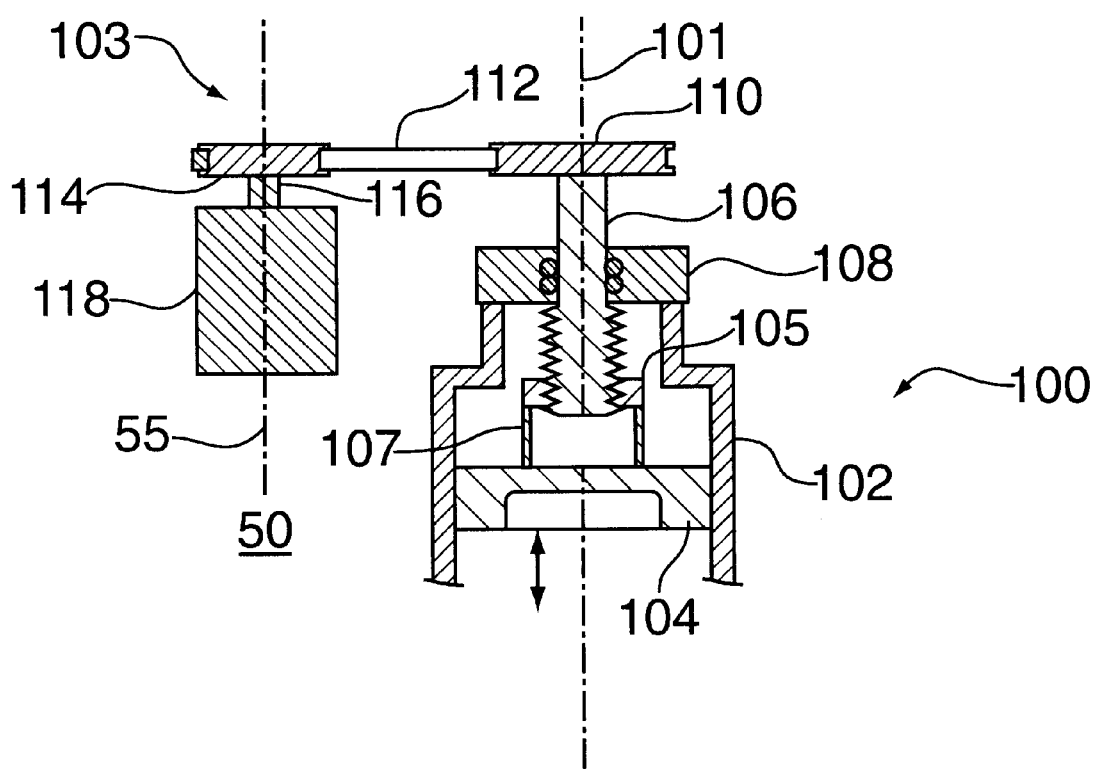
FIG. 1 depicts a partial vertical cross sectional view of a prior art throttle valve mechanism.
Figure 2:
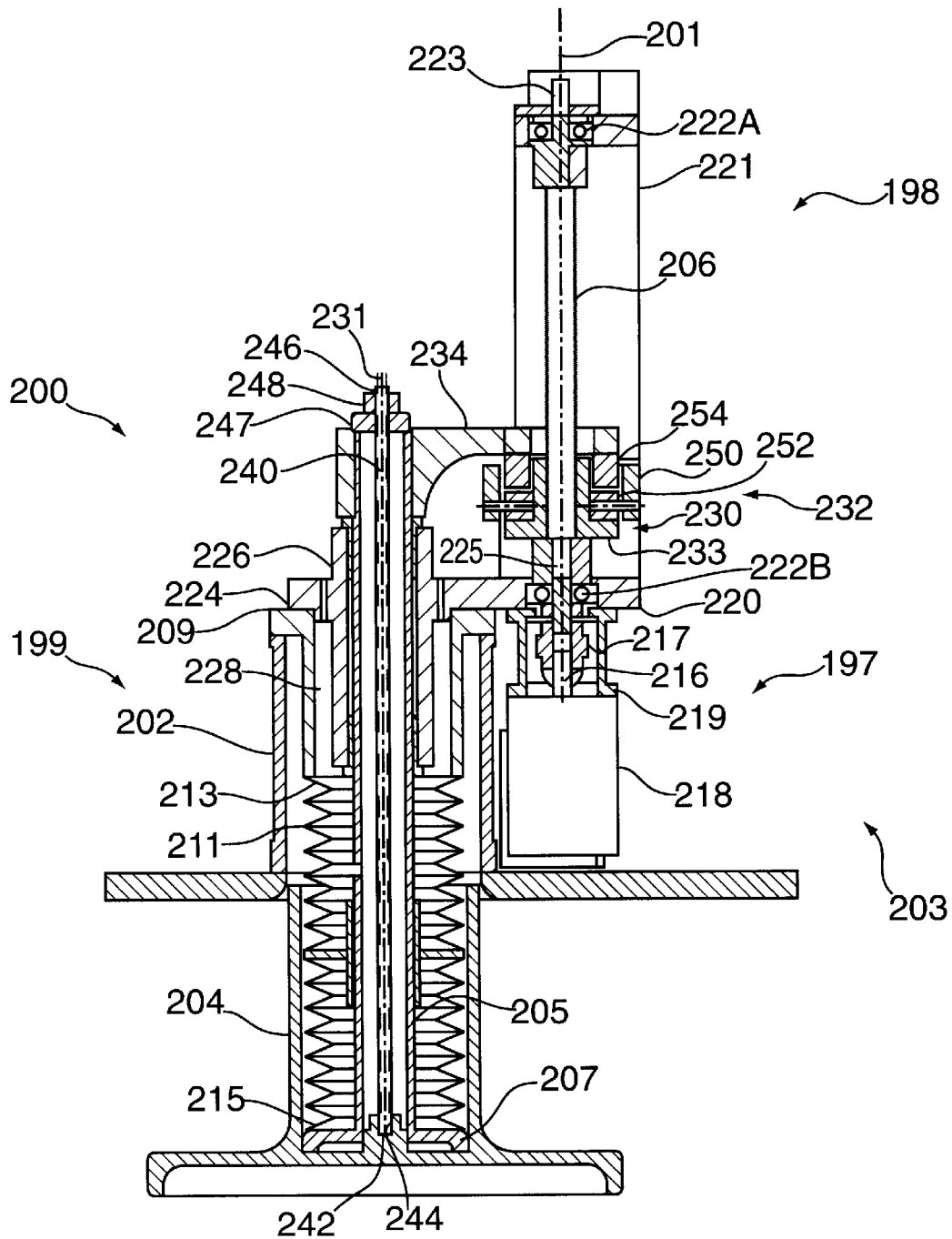
FIG. 2 depicts a vertical cross sectional view of a throttle valve assembly of the present invention.
Figure 3A:
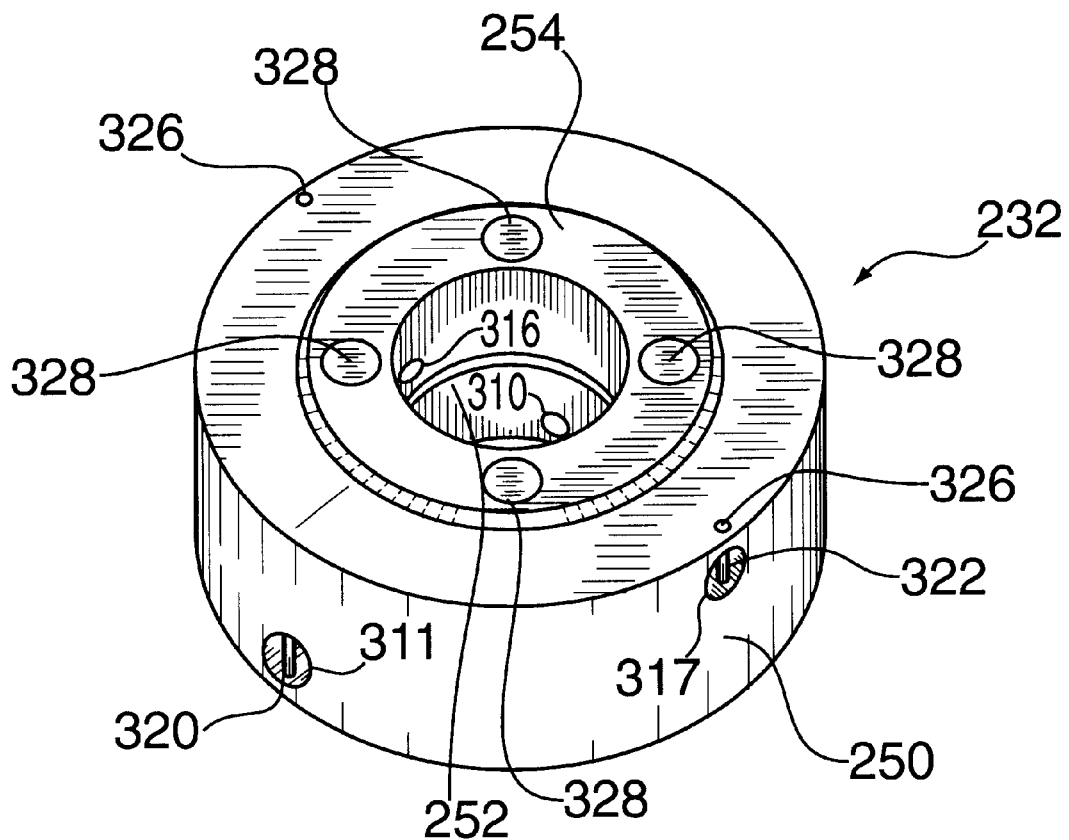
FIG. 3A is a perspective view of a universal coupler of the present invention.

FIG. 2 depicts a vertical cross-sectional view of a throttle valve assembly 200. The throttle valve assembly 200 comprises a throttle valve 199 actuated by a self aligning lift screw mechanism 203 of the present invention. The throttle valve assembly 199 comprises a valve body 202 and a plunger 204. The plunger 204 moves linearly relative to the valve body 202 to regulate the flow of a liquid or gas. The plunger 204 is driven and guided vertically by a plunger guide 205. The plunger guide is substantially tubular and has a radially extending flange 207 at a lower, distal end. The plunger 204 is connected to the plunger guide 205 by a threaded stud 240. A lower end 242 of the stud 240 threads into a threaded bore 244 in the plunger 204. An upper end 246 of the stud 240 is received in a bore 247 in the upper end of the plunger guide 205. A nut 248 received on the stud 240 retains the stud 240 and hence, the plunger 204. An interior of the valve body 202 is isolated from an exterior thereof by a cap 209 and a bellows 211. The bellows 211 is sealed at an upper end 213 to the cap 209 and at a lower end 215 to the flange 207 on the plunger guide 205. As such, the atmosphere side is sealed from the inside of the valve body. The plunger guide 205 is driven and guided by the self aligning lift screw mechanism 203.

The self aligning lift screw mechanism 203 comprises a motor assembly 197 and a drive screw assembly 198, mounted to a housing 220. An inventive universal coupler 232 and a drive coupler 234 couple the drive screw assembly 198 to the valve 199. The motor assembly 197 comprises a motor 218, a flange 219, and a flexible coupling 217. The drive screw assembly 198 comprises a drive screw 206 and a threaded collar 230. The drive screw 206 is rotatably driven by the motor 218. The motor 218 has a drive shaft 216 that is coupled to the drive screw 206 by the flexible coupling 217. he motor 218 is attached to the housing 220 by the flange 19. The motor 218 may be any type of motor suitable for driving the drive screw 206. For example, the motor 218 may be a computer controllable stepper motor that rotates the drive screw 206 by small, discrete increments. Each incremental rotation of the drive screw 206 thereby imparts an incremental translation to the plunger 204.

The drive screw 206 rotates about a first axis 201. The threaded collar 230 engages the threads of the drive screw 206 such that rotation of the drive screw 206 imparts vertical movement to the collar 230 substantially parallel to the first axis 201. The housing 220 is substantially L shaped. A vertical portion of the housing forms a frame 221. The screw 206 is rotatably mounted within the frame 221 at an upper end 223 and a lower end 225 by bearings 222A and 222B, respectively. A horizontal portion 224 of the housing 220 includes a bushing 226 that interfits a bore 228 in the cap 209. The plunger guide 205 is received in the bushing 226 for vertical movement with respect to the housing 220 along a second axis 231. The first axis 201 and the second axis 231 are substantially parallel to each other. The collar 230 is coupled to the plunger guide 205 by a universal coupler 232 and the drive coupler 234. The collar 230 has a flange 233 that supports the universal coupler 232. The universal coupler 232 relieves any bending strain induced by misalignment between the drive screw 206 and the plunger guide 205 by allowing pivotal movement therebetween.

The details of the construction of the universal coupler 232 are best appreciated by simultaneously referring to FIG. 2 and FIGS. 3A–3C. The universal coupler 232 comprises an outer cylinder 250, a first inner cylinder 252 and a second inner cylinder 254. The first and second inner cylinders 252 and 254 are disposed adjacent each other within a first axial bore 302 in the outer cylinder 250. The axial bore 302 is substantially coaxially aligned with the outer cylinder 250 and the inner cylinders 252 and 254. The first inner cylinder 252 has a second axial bore 304 and the second inner cylinder has a third axial bore 306. The threaded collar 230 is received in the axial bore 304 in the first inner cylinder 252. The collar 230 has an outside diameter that closely matches an inside diameter of the first inner cylinder 252. As such, the collar 230 may be attached to the first inner cylinder 252 by press fitting into the bore 304 in the first inner cylinder 252. Alternatively, the collar 230 may be attached to the first inner 252 cylinder by means such as screws, bolts, pins or any similar attachment means. The cylinders are typically made of metals or similar durable materials. For example, the outer cylinder 250 is made of Alloy 932 bronze and the two inner cylinders 252 and 254 are made of 303 stainless steel.

The first inner cylinder 252 is pivotally attached to the outer cylinder 250 by two dowel pins 308 that fit into horizontally opposed aligned pin-holes 310 and 311 in the first inner cylinder 252 and the outer cylinder 250. The dowel pins 308 and holes 310 are aligned such that the first inner cylinder 252 is free to pivot relative to the outer cylinder 250 about a first pivot axis 312. Similarly, the second inner cylinder 254 is attached to the outer cylinder 250 by two dowel-pins 314 that fit in horizontally opposed aligned pin-holes 316 and 317 in the second inner cylinder 254 and the outer cylinder 250. The pins 314 and holes 316 and 317 are aligned such that the second inner cylinder 254 is free to pivot relative to the outer cylinder 250 about a second pivot axis 318. The second inner cylinder 254 has an inside diameter that is larger than an outside diameter of the collar 230. As such, the collar 230 has a small range of pivotal movement within the bore 306 in the second inner cylinder 254. Preferably, the first pivot axis 312 and the second pivot axis 318 are perpendicular to each other. The dowel pins 308 and 314 are retained within the holes 310 and 316 by spring pins 320 and 322. The spring pins are situated in spring pin holes 324 and 326 drilled through the outer cylinder 250. The spring pin holes 324 and 326 intersect the pin-holes 310 and 316 at right angles.

The second inner cylinder is attached to the drive coupler 234 by conventional means. For example threaded holes 328 may be formed in the second inner cylinder 254 to facilitate attachment to the drive coupler 234 by screws, bolts or other threaded fasteners.

When the motor 218 rotates the drive screw 206, the drive screw 206 turns in the collar 230. The threads of the screw 206 engage the threads of the collar 230 thereby imparting movement to the collar along the drive screw 206. The collar pushes on the first cylinder 252 of the universal coupler 232. The first inner cylinder pushes on the dowel pins 308 which, in turn, push on the outer cylinder 250 of the universal coupler 252. The outer cylinder 250 pushes on the dowel pins 314 which, in turn, push on the second inner cylinder 254 of the universal coupler 250. The second outer cylinder pushes on drive coupler 234. The drive coupler imparts linear motion to the plunger 204 via the threaded stud 240 and plunger guide 205. The universal coupler 232 allows for slight pivotal movement of the drive coupler 234 relative to the drive screw 206 thereby relieve any bending strain between them.

Although the lift screw mechanism 203 and universal coupler 232 of the present invention have been described herein with respect to a throttle valve assembly, other applications are considered to be within the scope of the invention. For example, the universal coupler 232 may be employed wherever it is necessary to relieve a bending strain between a drive member and a driven element due to misalignment therebetween.

Although various embodiments which incorporate the teachings of the present invention have been shown and described in detail herein, those skilled in the art can readily devise many other varied embodiments that still incorporate these teachings.

What is claimed is:

1. A universal coupler for a self aligning linear actuator, comprising:
   an outer cylinder having a first axial bore;
   a first inner cylinder, disposed within said first axial bore, substantially coaxially aligned with said outer cylinder; and
   a second inner cylinder disposed within said first axial bore, substantially coaxially aligned with said outer cylinder and said first inner cylinder;
   wherein said first and second inner cylinders are pivotally connected to said outer cylinder such that pivotal movement of one or both of said inner cylinders relieves a bending strain between a driving member coupled to said first inner cylinder and a drive coupler coupled to said second inner cylinder due to misalignment between said driving member and said drive coupler.

2. The universal coupler set forth in claim 1 wherein said first and second inner cylinders have approximately the same outer diameter and are axially adjacent one another.

3. The universal coupler set forth in claim 1 wherein said driving member is threaded.

4. The universal coupler set forth in claim 3 further comprising a threaded collar, attached to said first inner cylinder, that engages threads of said driving member thereby imparting axial movement to said drive coupler along an axis of said driving member when said driving member rotates.

5. The universal coupler set forth in claim 2 further comprising a first pair of opposed dowel-pins, disposed between said first inner cylinder and said outer cylinder, such that said first inner cylinder and said outer cylinder are coupled for pivotal movement about a first pivot axis perpendicular to an axis of said outer cylinder.

6. The universal coupler set forth in claim 5 further comprising a second pair of opposed dowel-pins, disposed between said second inner cylinder and said outer cylinder, such that said second inner cylinder and said outer cylinder are coupled for pivotal movement about a second pivot axis perpendicular to said first axis and said axis of said outer cylinder.

7. A self aligning lift screw mechanism, comprising:
   a threaded driving member, adapted for rotational movement about a first axis;
   a drive coupler, coupled to said driving member, adapted for translational movement along a second axis that is substantially parallel to said first axis;
   a threaded collar, that threadedly engages said driving member; and
   a universal coupler, connected to said collar and said drive coupler, such that said driving member imparts translational movement to said drive coupler along said second axis when said driving member rotates about said first axis,
   wherein said universal coupler relieves a bending strain between said driving member and said drive coupler by allowing pivotal movement of one or both of said driving member and said drive coupler due to misalignment therebetween.

8. The self aligning lift screw mechanism as set forth in claim 7 further comprising a motor, directly coupled to said driving member, for imparting rotational movement to said driving member about said first axis.

9. The self aligning lift screw mechanism as set forth in claim 7 wherein said threaded driving member is a drive screw.

10. The self aligning lift screw mechanism as set forth in claim 7 wherein said threaded driving member is a ball screw.

11. The self aligning lift screw mechanism set forth in claim 7 wherein said universal coupler comprises:
    an outer cylinder having a first axial bore;
    a first inner cylinder, coupled to said driving member, said first inner cylinder being disposed within said first axial bore and substantially coaxially aligned with said outer cylinder; and
    a second inner cylinder, connected to said drive coupler, disposed within said first axial bore, said second inner cylinder being substantially coaxially aligned with said outer cylinder and said first inner cylinder;
    wherein said first and second inner cylinders are pivotally connected to said outer cylinder such that pivotal movement of one or both of said inner cylinders relieves a bending strain between said driving member and said drive coupler coupled to said second inner cylinder due to misalignment between said driving member and said drive coupler.

12. The self aligning lift screw mechanism set forth in claim 11 further comprising a first pair of opposed dowel-pins, disposed between said first inner cylinder and said outer cylinder, such that said first inner cylinder and said outer cylinder are coupled for pivotal movement about a first pivot axis perpendicular to an axis of said outer cylinder.

13. The self aligning lift screw mechanism set forth in claim 12 further comprising a second pair of opposed dowel-pins, disposed between said second inner cylinder and said outer cylinder, such that said second inner cylinder and said outer cylinder are coupled for pivotal movement about a second pivot axis perpendicular to said first axis and said axis of said outer cylinder.

14. A throttle valve assembly, comprising:
    a valve body;
    a housing attached to said valve body;
    a threaded driving member, mounted within said housing for rotational movement about a first axis;
    a motor, directly coupled to said driving member, for imparting rotational movement to said driving member about said first axis;
    a drive coupler, coupled to said driving member, adapted for translational movement along a second axis that is substantially parallel to said first axis;
    a plunger guide, substantially aligned with said second axis, attached at a first end to said drive coupler such that linear motion of said drive coupler imparts linear motion to said plunger guide;

a plunger, attached to a second end of said plunger guide, disposed within said valve body;

a threaded collar, that engages threads of said driving member; and a universal coupler, connected to said collar and said drive coupler, such that said driving member axis imparts translational movement to said drive coupler along said second axis when said driving member rotates about said first, wherein said universal coupler relieves a bending strain between said driving member and said drive coupler by allowing pivotal movement of one or both of said driving member and said drive coupler due to misalignment therebetween.

15. The throttle valve assembly of claim 14 further wherein said driving member has first and second ends and said driving member is rotatably supported in said housing at said first and second ends.

16. The throttle valve assembly of claim 14 wherein said universal coupler comprises:

an outer cylinder having a first axial bore;

a first inner cylinder, coupled to said driving member, said first inner cylinder being disposed within said first axial bore and substantially coaxially aligned with said outer cylinder; and a second inner cylinder, connected to said drive coupler, disposed within said first axial bore, said second inner cylinder being substantially coaxially aligned with said outer cylinder and said first inner cylinder;

wherein said first and second inner cylinders are pivotally connected to said outer cylinder such that pivotal movement of one or both of said inner cylinders relieves a bending strain between said driving member and said drive coupler coupled to said second inner cylinder due to misalignment between said driving member and said drive coupler.

17. The throttle valve assembly set forth in claim 16 further comprising a first pair of opposed dowel-pins, disposed between said first inner cylinder and said outer cylinder, such that said first inner cylinder and said outer cylinder are coupled for pivotal movement about a first pivot axis perpendicular to an axis of said outer cylinder.

18. The throttle valve assembly set forth in claim 17 further comprising a second pair of opposed dowel-pins, disposed between said second inner cylinder and said outer cylinder, such that said second inner cylinder and said outer cylinder are coupled for pivotal movement about a second pivot axis perpendicular to said first axis and said axis of said outer cylinder.

19. The throttle valve assembly set forth in claim 14 further comprising:

a cap that covers an opening in said valve body wherein said plunger guide is received through a bore in said cap; and a flexible bellows, disposed about said plunger guide, said bellows being sealed at a first end to said cap and sealed at a second end to said plunger such that an atmosphere side of said throttle valve is isolated from a vacuum side of said throttle valve.

20. The throttle valve assembly set forth in claim 14 wherein said motor is a stepper motor.

* * * * *